United States Patent [19]
Christenson

[11] Patent Number: 5,090,495
[45] Date of Patent: Feb. 25, 1992

[54] TAG AXLE FOR REFUSE TRUCK

[75] Inventor: Ronald E. Christenson, Kasson, Minn.

[73] Assignee: McNeilus Truck and Manufacturing, Inc., Dodge Center, Minn.

[21] Appl. No.: 620,662

[22] Filed: Dec. 3, 1990

[51] Int. Cl.⁵ .................. B62D 61/12; B60G 11/27
[52] U.S. Cl. .................... 180/24.02; 180/209; 280/704; 280/711
[58] Field of Search ............... 180/209, 24.02; 280/704, 711, 43.17, 43.22, 43.23, 405.1, 764.1

[56] References Cited

U.S. PATENT DOCUMENTS

| | | | |
|---|---|---|---|
| 3,246,884 | 4/1966 | Prichard | 366/41 |
| 3,264,009 | 8/1966 | Langendorf | 280/81.1 |
| 3,271,077 | 9/1966 | Timmer et al. | 298/22 R |
| 3,610,653 | 10/1971 | Derrwaldt | 280/81.1 |
| 3,685,853 | 8/1972 | Goldsmith | 280/81.1 |
| 3,704,896 | 12/1972 | Buelow | 280/81.6 |
| 3,739,927 | 6/1973 | Gollnick | 414/525.54 |
| 3,752,496 | 8/1973 | Meinecke, Jr. | 280/81.1 |
| 3,900,119 | 8/1975 | Olsen | 414/563 |
| 4,063,779 | 12/1977 | Martin et al. | 298/22 P |
| 4,171,830 | 10/1979 | Metz | 280/711 |
| 4,280,710 | 7/1981 | Rogge | 280/81.1 |
| 4,705,133 | 11/1987 | Christenson et al. | 180/209 |
| 4,762,421 | 8/1988 | Christenson et al. | 366/54 |

Primary Examiner—Charles A. Marmor
Assistant Examiner—Tamara L. Finlay
Attorney, Agent, or Firm—Haugen and Nikolai

[57] ABSTRACT

An improved tag axle system disclosed which is designed to be accommodated by the tailgate structure of a rear-loading trash compacting refuse truck to provide auxiliary support to prevent overloading of the rear axle of the truck and to better distribute the relative weight carried by all axles of the truck assembly. The system uses a pair of aligned spaced stub axles each having its own separate suspension system and mechanism which operates to raise and lower a wheel assembly. The systems are located on either side of the tailgate assembly and are preferably built as an integral part of it. The axles are further configured so as to be raised or lowered with the use of pneumatic springs.

12 Claims, 5 Drawing Sheets

TAG AXLE FOR REFUSE TRUCK

BACKGROUND OF THE INVENTION

I. Field of the Invention

The present invention is directed generally to equalizing the axle loading of multi-axle vehicles of a working class associated with transporting rather heavy loads which may not be uniformly carried by or distributed among the several axles. More particularly, the present invention involves tag axle assemblies capable of being moved between a first position in which the wheel, or wheels, of the assembly are elevated and a second lowered or load bearing position in which the wheel, or wheels, engage the ground. The improved tag axle assembly of the present invention is specifically designed to be accommodated by the tailgate structure of a rear-loading trash compacting refuse truck to provide auxiliary support to prevent overloading of the rear axle of the truck and to better distribute the relative weight carried by all axles of the truck assembly.

II. Description of the Related Art

Retractable load support devices known as tag axle, tandem axle, or auxiliary axle assemblies are well known in the realm of work vehicles and particularly in hauling vehicles adapted to carry loads of widely varying weight and bulk. The use of downwardly deployable auxiliary or tag axle assemblies makes it possible for such vehicles to add axles and carry more weight—yet comply with regulations governing the legal weight such vehicles can carry over state and federal highways. It has generally been the practice to design tag axle assemblies so that the wheels can be placed in a ground engaging, truck supporting position when desired and elevated and stowed in a manner which does not otherwise interfere with the operation of the vehicle at such times as the tag axle support is unnecessary.

Devices to assist vehicles in meeting load limit restrictions include, for example, those illustrated and described in U.S. Pat. Nos. 4,705,133 and 4,762,421 by Ronald E. Christenson, the inventor in the present application, and Garwin D. McNeilus. Both of these prior patents are assigned to the same assignee as the present invention. These patents are of interest inasmuch as they illustrate tag axle assemblies which extend from the rear of a vehicle and are pivoted between a first or ground engaging position and a second elevated or stowed position. Extended reach tag axle assemblies such as those illustrated by the cited references, for example, generally incorporate a suspension operated by an hydraulic cylinder in conjunction with an hydraulic accumulator to provide the means to raise and lower the tag axle system. In addition, such systems have generally been concerned solely with adding an additional axle for the sake of reducing the per-axle loading below a legal limit so that the hauling or work device of interest does not exceed a legal loading limit when operated on a public highway. Such systems direct little or no concern to redistributing the total weight of the load to not only relieve some of the weight load from an adjacent axle, but also to add overall stability to the loading with respect to the entire vehicle.

Certain hauling vehicles commonly include a truck chassis fitted with a body that is specifically designed for a given task. In the case of refuse trucks, this includes devices for receiving, compacting and discharging refuse materials. One very successful design of such custom-made truck bodies includes a refuse container reservoir accessible for loading and discharging from the rear of the vehicle. This system includes a rear refuse receiving hopper designed to be swept by an hydraulic compacting mechanism which repeatedly compacts the refuse after each loading. In this manner, the refuse eventually fills the available useable reservoir volume extending from the front end back toward the rear of the body until no more material can be compacted. Such a vehicle is generally further illustrated and described in U.S. Pat. No. 3,739,927 and any necessary details from that description may be deemed to be incorporated herein by reference.

It will further be appreciated with regard to refuse hauling trucks of the class described that the loading trough area or tailgate hopper in the rear of the truck extends for a considerable distance behind the rear or drive axle assembly of the vehicle. When this area is full, the compacting mechanism is actuated and it traps this material and sweeps it into the main body storage container of the refuse hauler. The tailgate itself is fabricated of heavy-duty steel assemblies and the compactor mechanism includes large hydraulic cylinders and pushers which have considerable weight. The weight of the tailgate assembly and mechanism make the truck chassis quite heavy even when it is empty. As refuse is loaded and compacted in the refuse hauler, the majority of the payload weight remains acting on the rear or drive axle assembly such that a full load usually cannot be hauled without causing the rear axle loading to exceed the legal limit.

In addition, conventional hydraulic ejector mechanisms for rear-loading refuse hauling vehicles are actuated by longitudinally disposed telescoping cylinders mounted beneath the refuse holding body. These containers further require an ejector configured to fully eject the contents of the refuse holding container including the tailgate area; and, at the same time, the design must accommodate the hydraulic cylinder thereBeneath. To meet these requirements, ejectors are designed such that the bottom portion of the ejector mechanism describes a front to rear incline which extends a considerable distance into the lower front portion of the useful reservoir or volume of the truck. This also causes the center of gravity of the load to be shifted rearward toward the drive axle.

The combined effect of the rather extended overhang with regard to the tailgate portion of the truck body, the heavy mechanical components, and the front void space associated with the ejector mechanism, result in more than the desired amount of the weight being carried by the rear axle assembly. Not only does this result in possible overloading of the rear axle assembly, but it also may result in an underloading of the front axle and instability with regard to the front portion of the vehicle as the load tends to tip the entire vehicle rearward.

Certain known previous solutions to this problem have included the use of an additional downwardly deployable axle forward of the rear driving axle, or axles. This successfully reduces the overload weight on the driving axle, or axles. However, because this additional axle has been located forward of the center of gravity of the payload, only part of the force actually functions to reduce the weight on the rear axle. The remaining force operates to reduce the weight on the front steering axle. This characteristically does not allow the front steering axle to be loaded up to the allowable axle weight limit to aid in producing a balanced load. The total weight of the vehicle still cannot reach its allowable limit because of the relatively lighter load on the front axle. The load thus remains with an undesirable rearwardly directed bias.

In addition to extending a fairly large distance behind the rear driving axle assembly of the refuse hauler, the tailgate portion is generally located relatively low to the ground for easy dumping of refuse cans or the like into the hauler receiving area at the very rear of the tailgate assembly. Because of this peculiarity, conventional tag axles, which require a rather large amount of vertical clearance to operate, will not fit under the trough or bucket portion of the tailgate because of its proximity to the ground. Also, the trough or bucket portion of the tailgate of the rear-loading refuse hauler extends from side to side of the hauler extending its close proximity to the ground nearly the full width of the truck thereby precluding the application of a conventional continuous axle tag axle assembly.

Accordingly, to alleviate these and other problems described with regard to rear-loaded, refuse hauling vehicles and other vehicles having similar load distribution characteristics, it is a primary object of the invention to provide a simple, practical mechanism to both assist in supporting the load behind the rear axle assembly of the vehicle and to, at the same time, stabilize the entire loaded vehicle with respect to distribution of the load among the several axles.

SUMMARY OF THE INVENTION

The present invention provides a downwardly deployable or tag axle system which is positioned a distance behind the rear driving wheel assembly suitable for selectively supporting the tailgate area of a rear-loading, compacting refuse hauler. This system produces a leveraging effect on the rear driving wheel system which reduces the effective weight carried by the rear driving wheels by an amount greater than the tag axle load and, at the same time, shifts weight forward to significantly increase the loading on the front steering axle thereby balancing the overall distribution of the load on the truck. Because the tag axle is spaced a distance behind the rear driving axles, the tag axle system of the invention also increases the distance between the front-most and rear-most axles of the vehicle known as the span distance. Normally a vehicle having a greater span distance is, by regulation, allowed to carry a greater total weight on each axle.

The tag axle system of the present invention is configured so as not to require that the bucket or trough portion of the tailgate be made higher to clear the center tube as would have been the case with known axles of the class. In addition, the actuators and pivots associated with the tag axle system of the present invention are constructed so as not to interfere with the operation of the trough or bucket portion of the conventional tailgate.

The tag axle system of the present invention contemplates a pair of spaced stub axles each having its own separate suspension system and mechanism which operates to raise and lower a wheel assembly. The systems are located on either side of the tailgate assembly and are preferably built as an integral part of it. The axles are further configured so as to be raised or lowered with the use of fluid operated springs which can be either conventional air-operated springs or springs of a rolling lobe type.

The preferred embodiment involves the use of a pair of air-operated springs in conjunction with a lever system such that the inflation of a first spring in conjunction with the release of pressure or deflation of the second spring results in the lowering or deployment of the tag axle to its load supporting position. Conversely, the deflation of the first spring in conjunction with the inflation of the second spring operates with the lever system to raise the axle such that the wheel is in the up or stowed position.

The fluid operating system can be configured so as to operate the two spaced wheels separately or together as desired. The system may be operated using hydraulic actuators but a pneumatic system is preferred because the hydraulic system would require additional parts including accumulators and hydraulic relief valves.

An unique pivotal mounting arrangement is provided for the air-operated springs which allows the mounted spring to change not only its length but its relative angle from its inflated to collapsed state. Unlike with conventional tag axle mounting systems, the first or lowering air-operated spring is provided with pivoting mounts on both ends. This mounting configuration allows considerably more rotary motion of the axle arm itself and thereby greatly increases axle lift. The result is considerably greater than conventional ground clearance when the tag axles are raised and stowed so that the refuse vehicle can back up over uneven ground, for example, when dumping the load at a dump or other refuse receiving location.

The tag axle assembly of the invention is preferably mounted within a wheel well provided as part of the tailgate hopper assembly. The system is designed to be supported from the tailgate assembly in the illustrative embodiment.

BRIEF DESCRIPTION OF THE DRAWINGS

In the drawings, wherein like numerals are employed to designate like parts through the same.

DETAILED DESCRIPTION

The downwardly deployable or tag axle system in conjunction with the present invention is described with reference to the several drawing views which illustrate an embodiment in which the system is positioned spaced rearward from the driving wheels and supporting the tailgate area of a rear-loading, compacting refuse hauler. While this represents a highly successful and important adaptation of the principles of the present invention, it is intended to be representative rather than limiting with respect to the other uses of the inventive concepts. With this in mind, the invention will next be described in considerable detail with reference to its application to a rear-loading refuse hauler.

Figure 1:
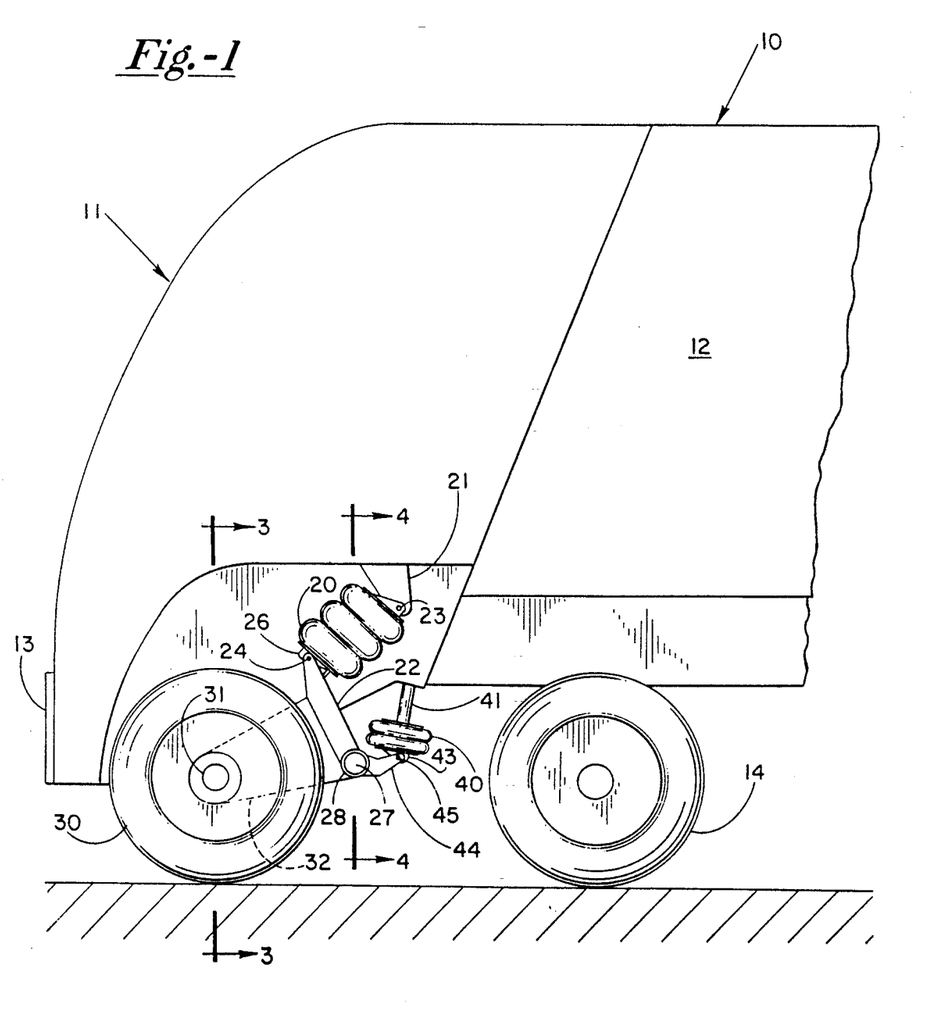
FIG. 1 is a partial or fragmentary side elevational view of a conventional rear-loading refuse vehicle depicting one tag axle assembly in its lowered or deployed position.
Figure 2:
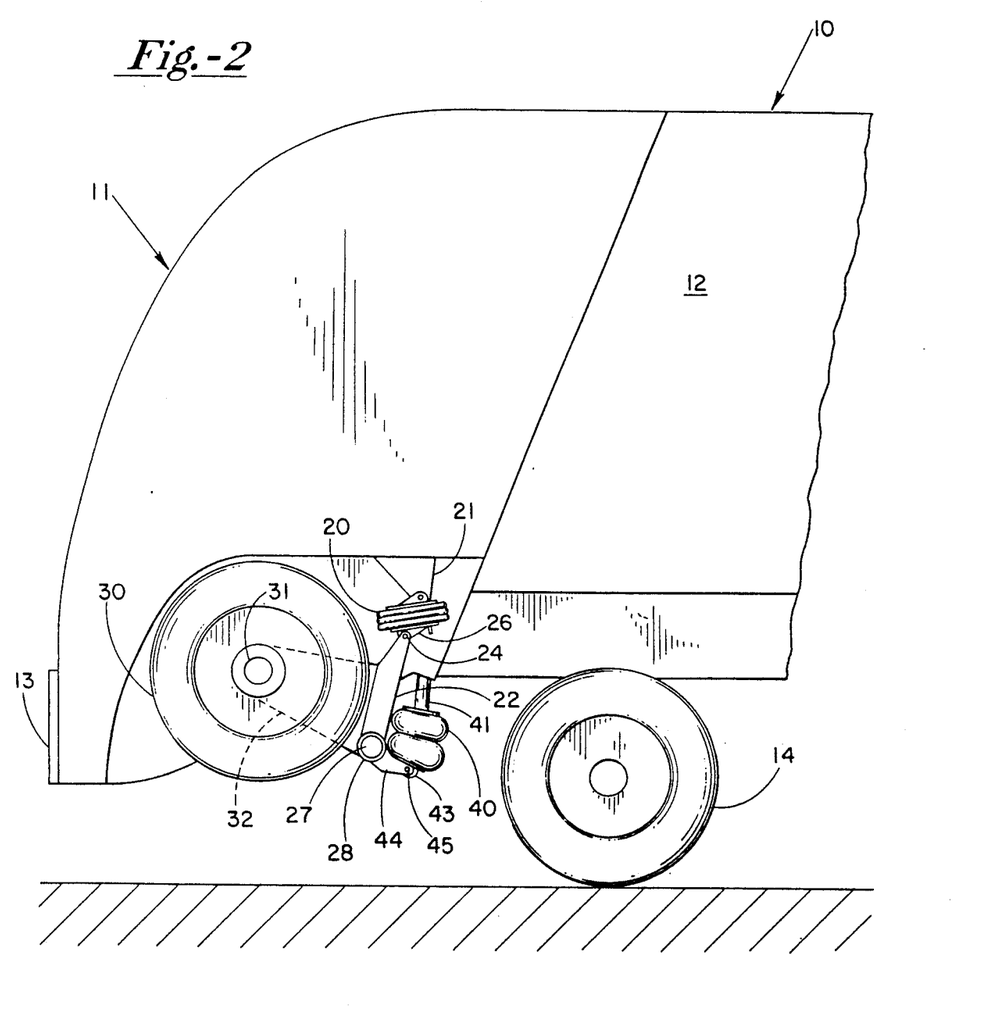
FIG. 2 is a view similar to that of FIG. 1 depicting the tag axle of the invention in its raised or stowed position.

FIG. 1 depicts a fragmentary side elevational view of the rear part of a conventional rear-loading, compacting refuse hauling vehicle, generally at 10, including a tailgate section 11 and a main refuse containing body section 12. The tailgate hopper section 11 further includes a tailgate hopper bumper member 13. The general location of the conventional rear axle drive wheels is illustrated by the wheel shown at 14. The wheel 14 depicts the normal rear-most point of support across the conventional refuse hauler. One of two substantially identical spaced tag axle systems is depicted in FIGS. 1 and 2 and, in greater detail, in the enlarged views of FIGS. 5 and 6. It further includes a lowering actuator which may be a pneumatically operated spring 20 pivotally mounted between an upper mounting bracket 21 and a lowering arm lever 22 using a pair of spaced top and bottom transverse pivot shafts 23 and 24 and top and bottom mounts shown at 35 and 34 which are, in turn, associated with pairs of spaced ears one of each of which is shown at 25 and 26. The lowering arm lever, in turn, pivots along and about a tag pivot shaft 27 which is provided with a bushing 28. The tag axle wheel 30 is mounted on a stub axle or spindle 31 which is carried by an axle mounting lever 32 which, in turn, is fixed to the lowering arm lever 22. A mount stop 33 is associated with the pivoting lowering actuator mount 34 which carries the ears as at 26 to aid in transmitting force from the pivot lowering actuator 20 to the pivot lowering arm 22.

Figure 5:
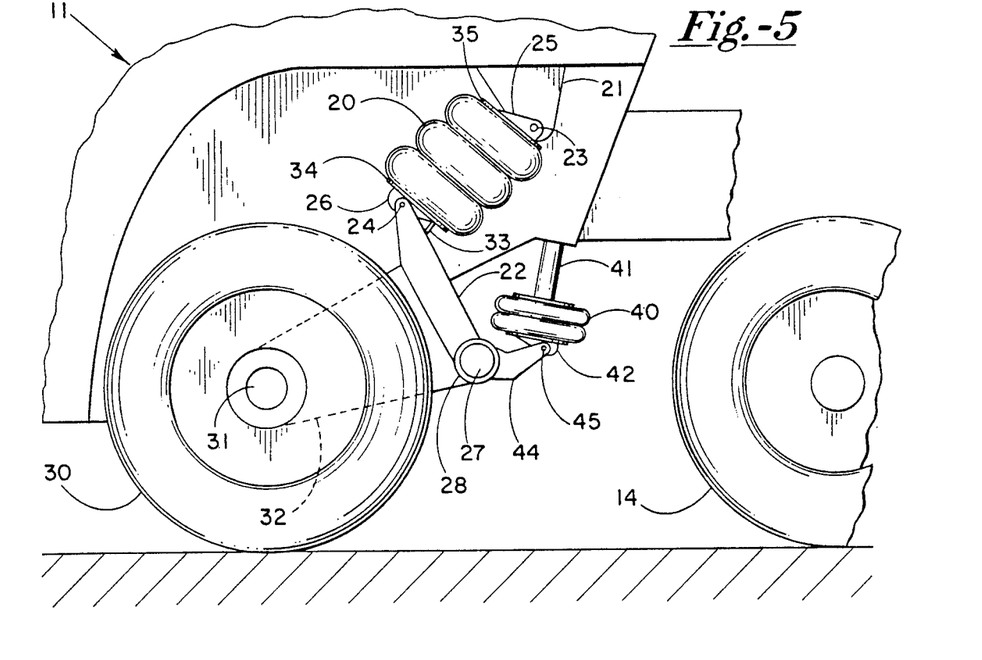
FIG. 5 is an enlarged fractional detailed view depicting the fully deployed wheel of FIG. 1.

The system is further provided with a tag axle suspension lift actuator, which may be an air-operated spring 40, the upper end of which is fixed in relation to the frame by a stationary mount 41 and which has a lower pivoting lift actuator mount 42 which further carries a pair of ears one of which is 43 and which pivotally mount the lower end of the lift actuator to a lift arm lever 44 including a shaft 45. As was the case with respect to the lowering arm lever, two spaced ears straddle the lift arm lever 44 and are pivotally joined with the spaced ears as at 43 of the lift actuator 40 and held as by a shaft or pin member 45.

Figure 4:
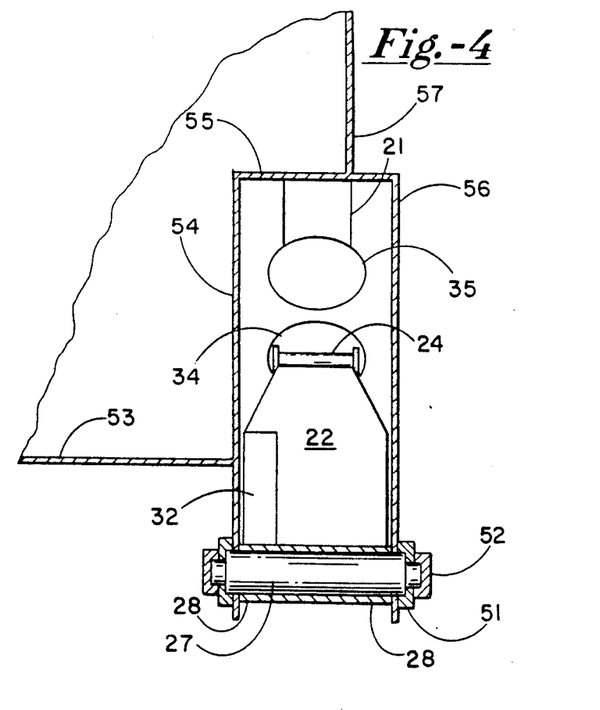
FIG. 4 is a vertical sectional view taken substantially along line 4—4 of FIG. 1.

The three-dimensional aspect of the axle mounting and lowering system are depicted in the fragmentary view of FIG. 4 which also depicts the tag axle pivot bushing as at 28 with pivot shaft 27 and pivot shaft mounting collars 51 and 52. The bottom of the tailgate hopper is shown at 53 and the side of the tailgate hopper wheel well at 54. The top of the tailgate hopper wheel well is depicted by border recess plate 55 and the tailgate hopper suspension outer support member is depicted at 56.

Figure 3:
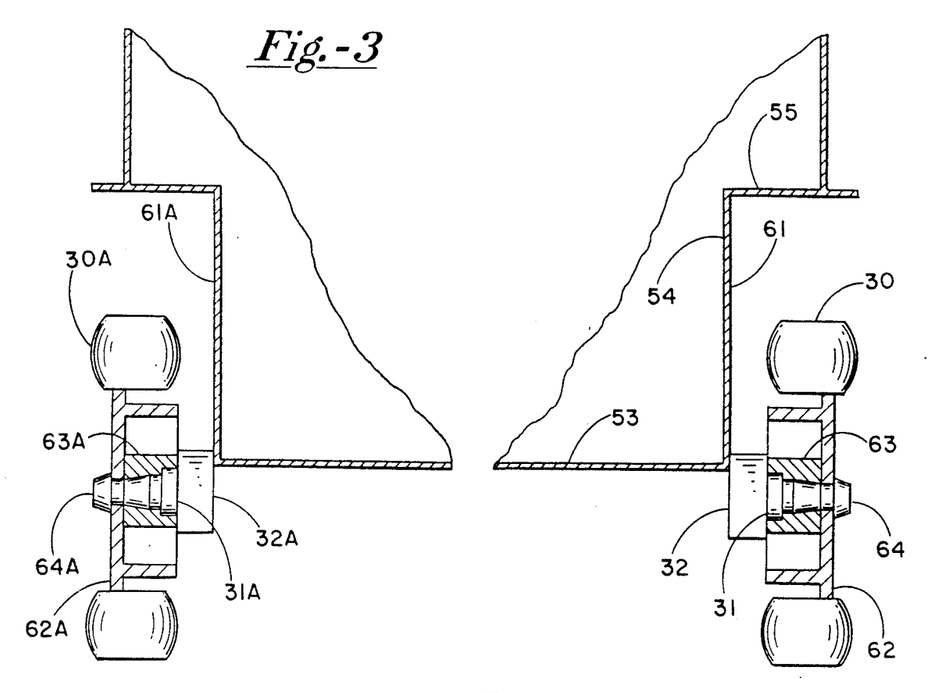
FIG. 3 is a fragmented sectional view taken substantially along lines 3—3 of FIG. 1.

As seen in the Figures, and particularly FIGS. 3 and 4, the axle mounting lever 32 which is connected to the lowering arm lever 22 is generally a relatively narrow connecting element which carries the stub axle or axle spindle 31, or 31A. FIG. 3 depicts both right and left tag axle arrangements. Parts referring to the left assembly are designated by numbers ending in "A". The axle mounting lever 32 or 32A is placed so that it is between the inside of the tag wheel tire 30, or 30A, and the outside surface 61, or 61A, of the tailgate hopper wheel well. The wheel is pivotally connected to the spindle by a wheel rim and brake as at 62 or 62A and axle hub 63, or 63A, bearing cover or grease cap as shown at 64, or 64A. The tag axle lowering actuator 20 is mounted on pivoting mount 21 such that the centering of the actuator is offset from the mount pivot. In the position shown in FIGS. 1 and 5, the position of the mounts 34 and 35 is determined by the mount stop 33 and the stationary lowering actuator mount 21.

FIGS. 1 and 5 show the tag axle in its lowered or deployed position. The lowering actuator 20 is fully expanded and the lifting or storing actuator 40 is fully deflated or contracted. The axle system is exerting a downward force on the highway due to the force of the lowering actuator 20 against the lowering arm 22 which causes it to rotate above the tag pivot shaft 27 which, in turn, pushes against the axle mounting lever 32.

Figure 6:
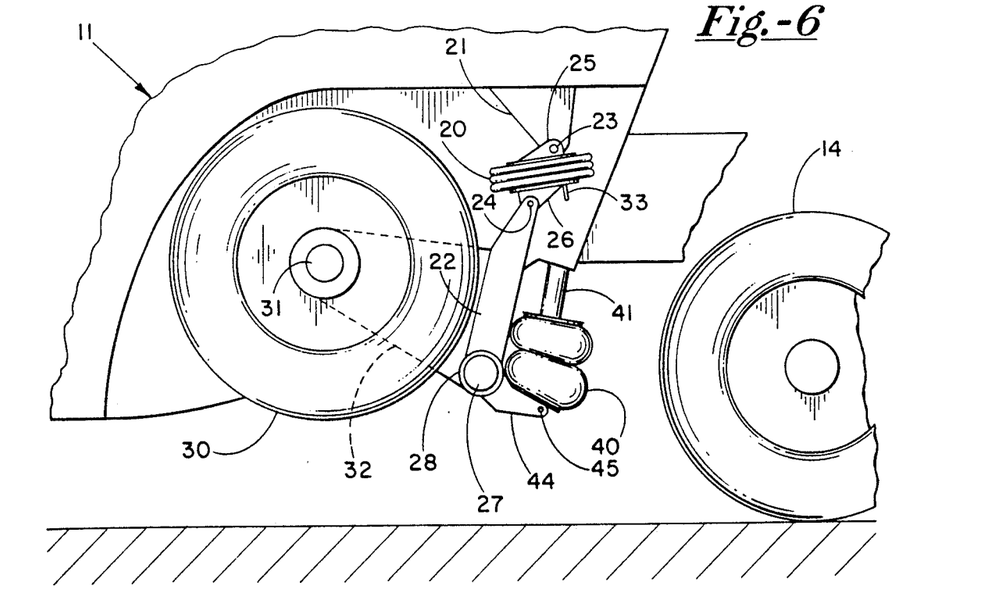
FIG. 6 is an enlarged fractional detailed view depicting the system as shown in the fully retracted or stowed position of FIG. 2.

FIGS. 2 and 6 depict the tag axle in the fully raised or stowed position. In this configuration the lift actuator 40 is fully pressurized or expanded and the lowering actuator 20 is fully deflated or contracted. In this position, the tag axle suspension lift actuators 40 exert the downward force on the lift arm lever 44 which, in turn, rotates the lowering arm lever 22 in a clockwise direction thereby lifting the axle mounting lever 32 and with it the wheel assembly.

As previously mentioned, it should be noted that the Figures, with the exception of FIG. 3, depict but one of a pair of tag axle systems associated with the present invention. A back-to-back or left to right identical system, of course, is correspondingly mounted on the opposite side of the refuse truck body. The description with regard to one such system can, thus, be applied to both.

Figure 7:
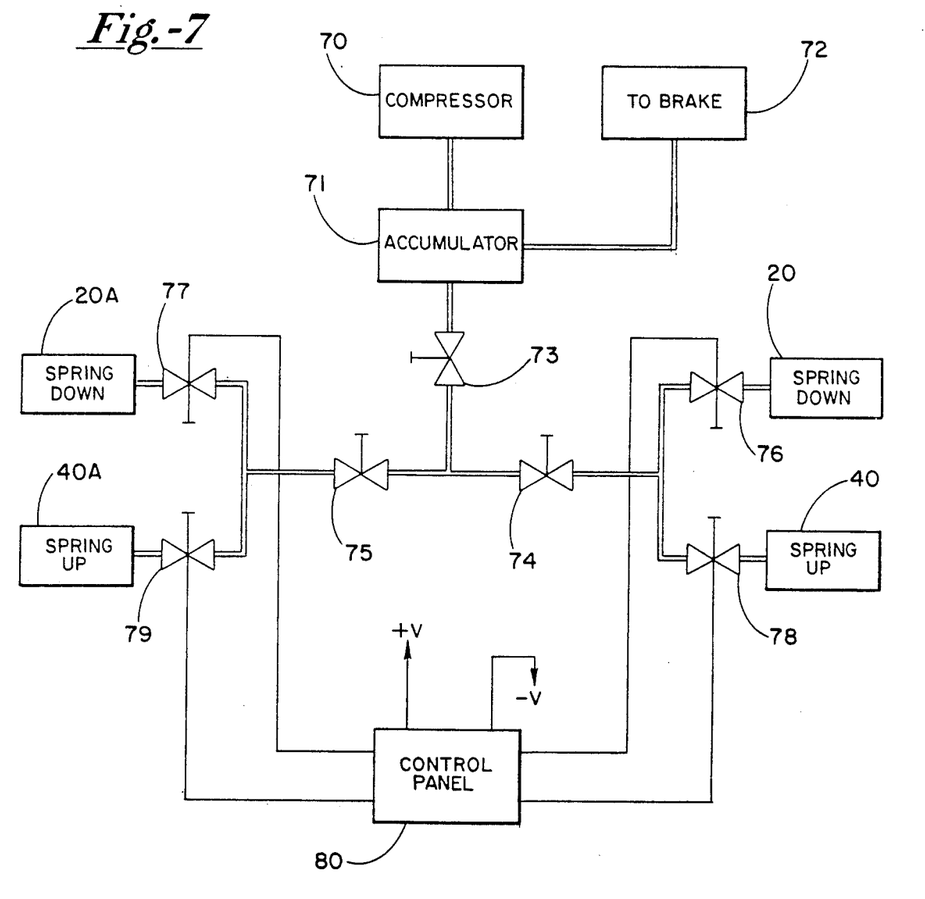
FIG. 7 is a schematic of an electric/pneumatic control system for use with the dual tag axle system of the invention.

The raising and lowering actuators are preferably pneumatic. The air-operated, conventionally vented, spring mechanisms which may be conventional air springs or springs of a rolling lobe type are connected to a compressor or other source of pressurized air or gas normally carried by the vehicle to supply air brakes, for example. The dual-tandem axles systems can be valved to be operated either singularly or in unison by using a conventional air or other fluid supply system as illustrated in FIG. 7. In FIG. 7, a compressor 70 provides air to an accumulator vessel 71 which may also supply compressed air to other systems such as air brakes, as indicated at 72. The system supplies air to the two tag axle deployment systems via valves 73, 74 and 75. Lowering actuators 20 and 20A are supplied through valves 76 and 77, respectively; and lift actuators 40 and 40A through valves 78 and 79, respectively. The valves 76–79, or all the valves, if desired can be electrically operated and vented from a conventional control panel illustrated by 80.

It should be appreciated that the tag axle pivot bushings 28 (FIG. 4) may be either brass or rubber with a plastic sleeve and the pivot shaft mounting collar 52 is intended to be moveable to allow alignment adjustments of the axle member 31. Further with respect to FIG. 4, the tailgate hopper suspension outer support 56 also stabilizes the outer end of the pivot shaft 27. The double pivot mounting of the lowering arm lever 22 in conjunction with the lowering actuator 20 enables the system to be fully raised with the lowering actuator clearing the wheel 30 and the lowering arm lever clearing the lift actuator 40.

FIGS. 3 and 4 illustrate how the tandem axles in accordance with the invention may be configured to be as narrow as possible allowing the tailgate hopper bin to be as wide as possible thereby minimizing interference with the capacity and normal operation of the refuse hauler itself. The double pivoting swivel action system allows lowering arm level 22 to rotate clockwise much further than would otherwise be possible as the actuator is only a limited range of length. In accordance with one aspect of the present invention, the fact that the lowering air spring 20 uses double pivotal mounts for connection in conjunction with the lowering arm is important because this allows considerably more rotary motion of the axle arm and thereby a great deal more axle lift. Accordingly, the tag axle ground clearance of the system of the present invention is about 13 inches; whereas, the corresponding tag axle ground clearance of most conventional systems is only about 4 to 8 inches. This is important inasmuch as it allows the truck to back up over the very uneven ground associated with many sites such as land fills where refuse is disposed. Because the tag axle is mounted within a wheel well which is part of the tailgate hopper assembly, it does not add to the overall dimensions of the truck itself and takes up a minimum amount of space with regard to the overall hopper capacity.

Although the present invention has been illustrated and described in connection with one particular successful embodiment, it will be understood that the description is intended to be illustrative of an application of the invention and by no means restrictive as to other forms or applications. The illustrative embodiment has been described in considerable detail in order to comply with the Patent Statutes and to provide those skilled in the art with the information needed to apply the novel principles and to construct and use such specialized components as are required. However, it is to be understood that the invention can be carried out by modified or specifically different embodiments and that one skilled in the art can make numerous revisions and adaptations of the invention and that such variations and modifications both as to equipment details and operating procedures can be accomplished without departing from the scope of the invention itself.

What is claimed is:

1. A downwardly deployable auxiliary wheel system associated with the provision of positioned levered auxiliary support to affect axle loading and load distribution in a multi-axle load hauling vehicle, the system including a pair of aligned spaced tag axle systems each of which comprises:
   a tag axle suspension system including an axle mounting lever carrying a stub axle and a wheel on the stub axle;
   fluid operated tag axle deployment means for applying a variable force urging the tag axle suspension in a generally downward direction such that the wheel engages the ground in supportive relation to the work vehicle;
   fluid operated tag axle retraction means for applying a force urging the tag wheel suspension in a generally upward direction such that the wheel is returned to a stowed position;
   lowering torque arm lever connected to the tag axle deployment means and rotatably mounted between a transverse pivot shaft and a tag pivot shaft and fixed to the axle mounting lever;
   lifting torque arm lever mounted on the tag pivot shaft in fixed angular relation to the lowering torque arm lever and connected in pivotal relation to the tag axle retraction means; and
   means for operating the fluid operated tag axle deployment means to apply a force to operate the lowering torque arm lever to deploy the tag wheel as desired and the fluid operated tag axle retraction means to apply a force to the lifting torque arm lever when it is desired to raise the tag axle system.

2. The apparatus of claim 1 wherein the tag axle deployment means is pivotally fixed to the truck body at its upper end such that both the tag axle deployment means and the lowering torque arm lever can pivot away from the wheel when the tag axle is raised thereby increasing the stowed ground clearance of the wheel.

3. The apparatus of claim 2 wherein the fluid operated deployment means and the fluid operated retraction means are air operated springs which elongate and collapse.

4. The apparatus of claim 1 wherein the fluid operated deployment means and the fluid operated retraction means are air operated springs which elongate and collapse.

5. In a multi-axle vehicle of a working class having a chassis and at least one drive axle assembly located in the rear portion of the chassis, the improvement comprising:
   a downwardly deployable auxiliary wheel system disposed in spaced substantially parallel relation to and located a distance rearward of the at least one drive axle and including a pair of aligned, spaced tag axle systems which, in the deployed or ground engaging position, assume an amount of the load carried by the drive axle assembly and shift the distribution of a still further amount of the load forward of the drive axle assembly;
   each of the pair of aligned spaced tag axle systems further comprising;
      a tag axle suspension system including an axle mounting lever carrying a stub axle and a wheel on the stub axle,
      fluid operated tag axle deployment means for urging the tag axle suspension in a generally downward direction such that the wheel engages the ground in supportive relation to the main frame of the work vehicle,
      fluid operated tag axle retraction means for urging the tag wheel suspension in a generally upward direction such that the wheel is restored to a stowed position,
      lowering torque arm lever connected to the tag axle deployment means and rotatably mounted between a transverse pivot shaft and a tag pivot shaft and fixed to the axle mounting lever,
      lifting torque arm lever mounted on the tag pivot shaft is fixed angular relation to the lowering torque arm lever and connected in pivotal relation to the tag axle retraction means, and
      means for operating the fluid operated tag axle deployment means to apply a force to operate the lowering torque arm lever to deploy the tag wheel as desired and the fluid operated tag axle retraction means to apply a force to the lifting torque arm lever when it is desired to raise the tag axle system.

6. The apparatus of claim 5 wherein the tag axle deployment means is pivotally fixed to the truck body at its upper end such that both the tag axle deployment means and the lowering torque arm lever can pivot in cooperation with the movement of the wheel when the tag axle is raised thereby increasing the stowed ground clearance of the wheel.

7. The apparatus of claim 6 wherein the fluid operated deployment means and the fluid operated retracted means are air operated springs which elongate and collapse.

8. The apparatus of claim 5 wherein the fluid operated deployment means and the fluid operated retraction means are air operated springs which elongate and collapse.

9. A load support and distribution system associated with the rear portion of a rear-loading refuse hauling vehicle of the class having one or more sets of drive wheels on one or more drive axles located rearward of the center of the vehicle chassis, a refuse receiving tailgate hopper spaced a distance behind the drive wheels for receiving refuse and a compacting means for compacting the refuse into a carrying compartment comprising:

a downwardly deployable auxiliary wheel system disposed in spaced substantially parallel relation to and located a distance behind the one or more drive axles and including a pair of aligned, spaced tag axle systems which, in the deployed or ground engaging position, assume an amount of the load carried by the drive axle assembly and shift the distribution of a still further amount of the load forward of the drive axle assembly;

wherein the pair of aligned spaced tag axle systems are carried by and fixed to the tailgate assembly, one of the pair being mounted on either side of the tailgate hopper; and each of the pair of aligned spaced tag axle systems further comprising;

a tag axle suspension system including an axle mounting lever carrying a stub axle and a wheel on the stub axle, fluid operated tag axle deployment means for urging the tag axle suspension in a generally downward direction such that the wheel engages the ground in supportive relation to the main frame of the work vehicle, fluid operated tag axle retraction means for urging the tag wheel suspension in a generally upward direction such that the wheel is restored to a stowed position, lowering torque arm lever connected to the tag axle deployment means and rotatably mounted between a transverse pivot shaft and a tag pivot shaft and fixed to the axle mounting lever, lifting torque arm lever mounted on the tag pivot shaft in fixed angular relation to the lowering torque arm lever and connected in pivotal relation to the tag axle retraction means, and means for operating the fluid operated tag axle deployment means to apply a force to operate the lowering torque arm lever to deploy the tag wheel as desired and the fluid operated tag axle retraction means to apply a force to the lifting torque arm lever when it is desired to raise up the tag axle system.

10. The apparatus of claim 9 wherein the tag axle deployment means is pivotally fixed to the truck body at its upper end such that both the tag axle deployment means and the lowering torque arm lever can pivot in cooperation with movement of the wheel when the tag axle is raised thereby increasing the stowed ground clearance of the wheel.

11. The apparatus of claim 10 wherein the fluid operated deployment means and the fluid operated retraction means are air operated springs which elongate and collapse.

12. The apparatus of claim 9 wherein the fluid operated deployment means and the fluid operated retraction means are air operated springs which elongate and collapse.

* * * * *

UNITED STATES PATENT AND TRADEMARK OFFICE
CERTIFICATE OF CORRECTION

PATENT NO. : 5 090 495

DATED : February 25, 1992

INVENTOR(S) : Ronald E. Christenson

It is certified that error appears in the above-identified patent and that said Letters Patent is hereby corrected as shown below:

In column 8, line 53, delete "is" and insert -- in -- .

Signed and Sealed this

Eighteenth Day of May, 1993

Attest:

MICHAEL K. KIRK

*Attesting Officer*  Acting Commissioner of Patents and Trademarks